Nov. 28, 1950  T. M. ROBERTSON  2,532,194
VACUUM-ACTUATED CLUTCH AND/OR BRAKE CONTROL
Filed April 17, 1946  2 Sheets-Sheet 1
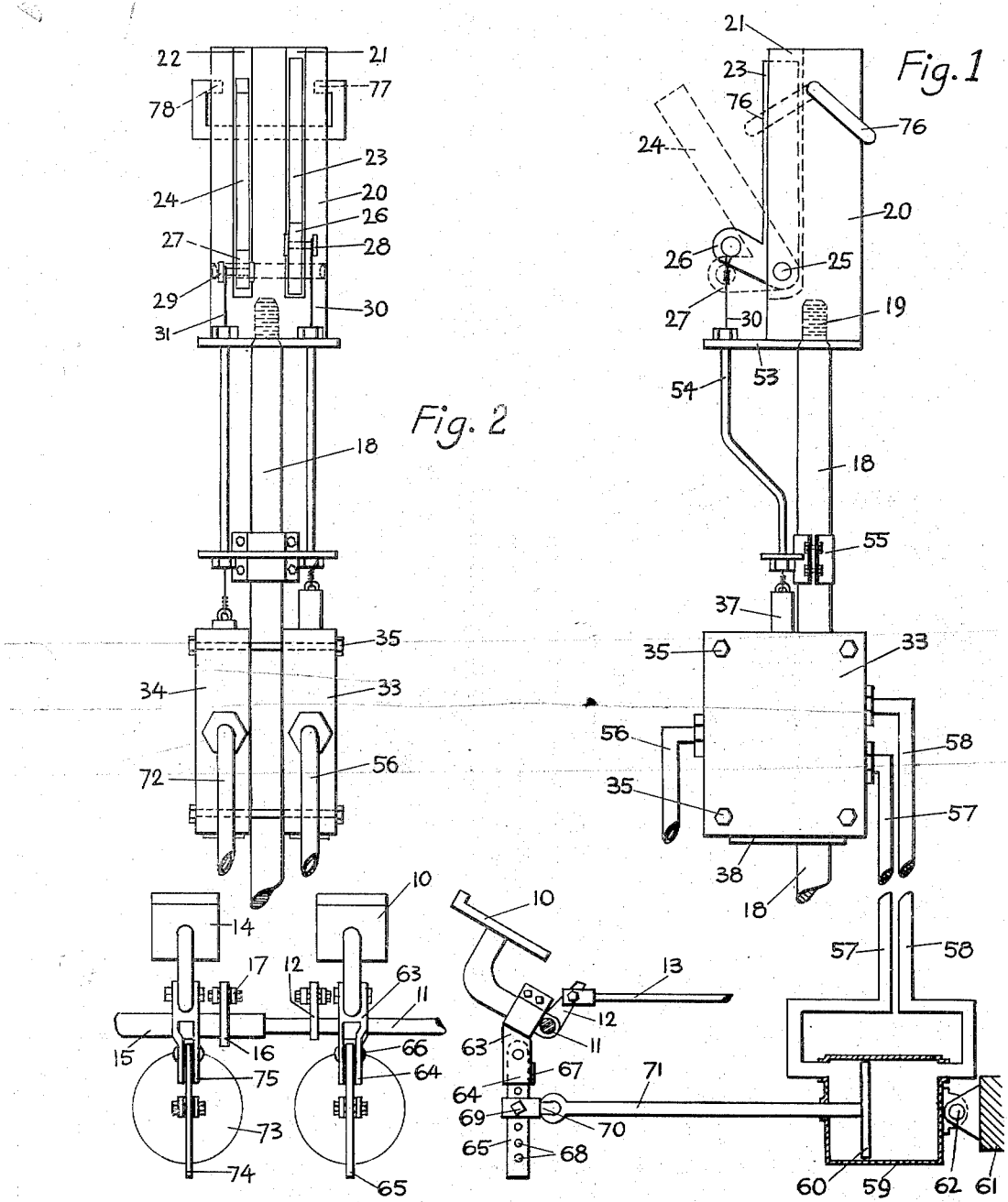
INVENTOR.
THOMAS M. ROBERTSON Nov. 28, 1950 T. M. ROBERTSON 2,532,194
VACUUM-ACTUATED CLUTCH AND/OR BRAKE CONTROL
Filed April 17, 1946 2 Sheets-Sheet 2
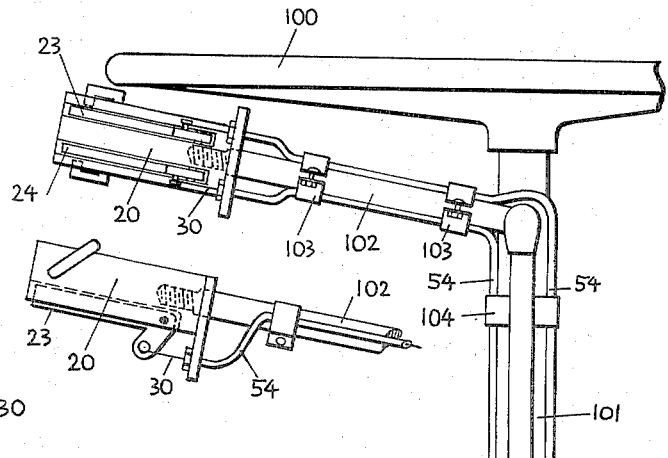
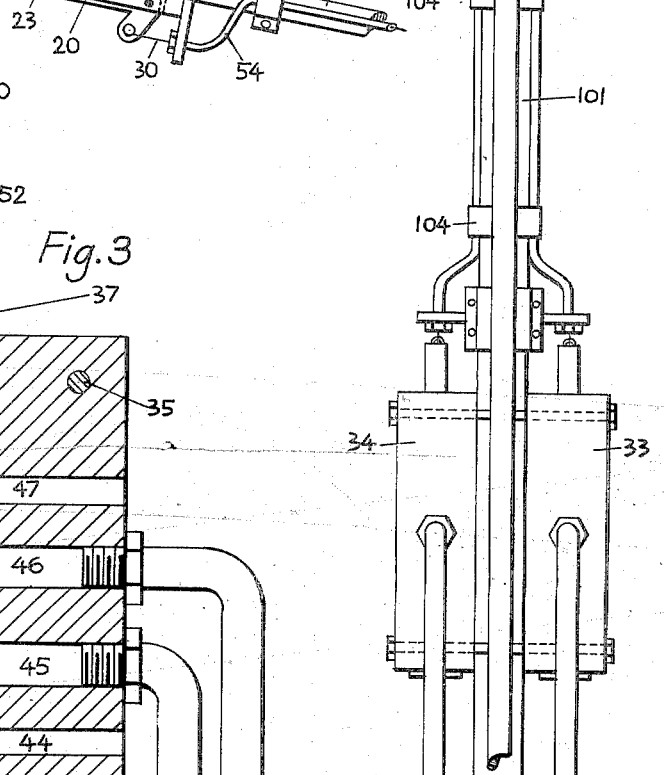
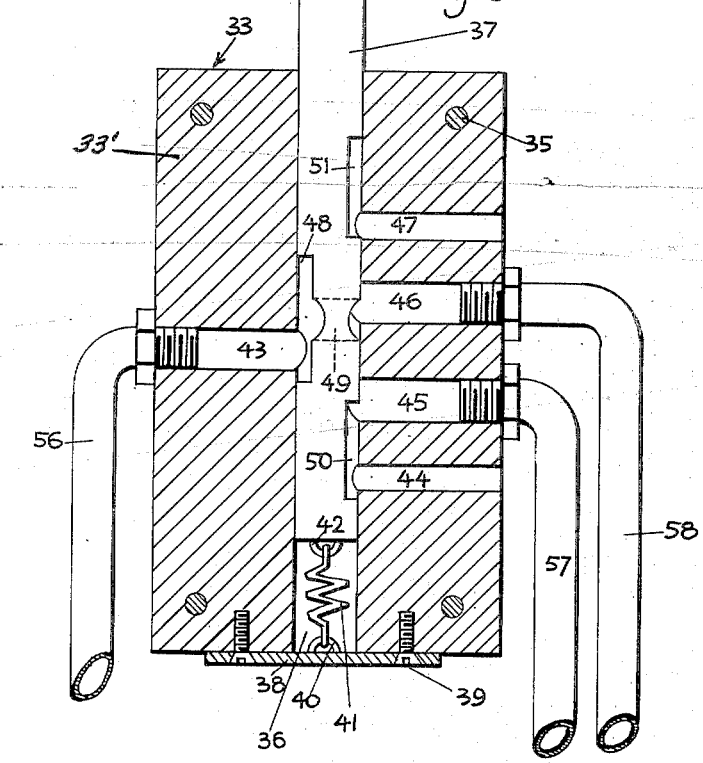
INVENTOR.
THOMAS M. ROBERTSON
BY Walter S. Olerton
ATTORNEY Patented Nov. 28, 1950

2,532,194

UNITED STATES PATENT OFFICE 2,532,194

VACUUM-ACTUATED CLUTCH AND/OR BRAKE CONTROL

Thomas M. Robertson, New York, N. Y.

Application April 17, 1946, Serial No. 662,898

7 Claims. (Cl. 192—3.5)

The invention relates to the control of a vehicle, such as an automobile, tractor or motor boat. The invention aims to provide means for actuating by hand a pedal-operative control device. More in particular, the invention aims to render a clutch and/or brake manually controllable without interfering with normal operativeness by means of a pedal or pedals or with other normal constructions and functions of the vehicle. Thus it is the purpose of the invention to enable a driver having the use of only one leg or not having the use of either leg readily to operate the vehicle provided with means according to the invention and even to alternate with a driver operating the vehicle in the conventional manner, i. e. by means of pedals, without any changes or readjustments.

Another object of the invention is the provision of an attachment to a vehicle of the mentioned character whereby a pedal-operative clutch and/or brake may be controlled by the operator's fingers of one hand.

A further object of the invention is the combination of the finger-operative control-element or elements with the gear-shift lever so that the operator need not alter the position of his hand during the necessary speed-changing operation.

Further objects and details of the invention will be apparent from the description hereinafter and the accompanying drawing illustrating an embodiment thereof by way of example.

In the drawing,

Figs. 1 and 2 are side-elevation and front elevation respectively of the invention applied to a car with upwardly extending gear-shift lever.

Fig. 3 is a cross-section on a larger scale, of a valve used in the embodiment of Figs. 1 and 2, Fig. 4 is a side-elevation of parts of the device of Figs. 1 and 2, applied to a gear-shift-lever in connection with the steering column of the vehicle, and Fig. 5 is a top plan view of the gear-shift-lever shown in Fig. 4.

Referring now to the drawing, the Figs. 1 and 2 illustrate the invention applied to both the clutch and the brake control of a conventional automobile having an upwardly extending gear shift lever. Parts of the automobile are shown only as far as necessary for the understanding of the invention. The conventional clutch control comprises the pedal 10 attached to the shaft 11 with arm 12 and a member 13 which disengages the clutch (not shown) when the pedal 10 is pressed down. Similarly, the brake control comprises the pedal 14, shaft 15, arm 16 and member 17 for operating the brakes (not shown). The gear shift lever is denoted by 18. From its threaded top end 19, the conventional knob has been removed and replaced by a handle 20 which is part of my invention. Handle 20 has two parallel lengthwise extending recesses 21 and 22 in which bell crank levers 23 and 24 are respectively pivoted by a pin 25. Lever 23, destined to operate the clutch, is shown in its depressed position whereas lever 24, operating the brakes, is shown in a position in which the brakes are released. The short arms 26 and 27 of the levers 23 and 24 are provided with means such as pins 28 and 29 for the attachment of flexible members such as wires 30 and 31. As the device for operating the clutch with the aid of lever 23 is similar to that for operating the brakes with the aid of lever 24 hereinafter only the structure of the manual clutch control will be described in detail. This control comprises a booster apparatus energized according to the manipulation of the lever 23 and acting on the clutch pedal 10. For this purpose, a valve 33 is provided which may be secured to any suitable part of the automobile, as for instance to the same gear shift lever 18 to which handle 20 has been attached. In the illustrated embodiment both valve 33 and the similar valve 34 for the manual brake control are clamped to that lever by means of screws 35. The valve 33 shown in cross-section in Fig. 3 comprises a body 33' with a longitudinal bore 36 in which a substantially cylindrical member 37 is shiftable. A bottom plate 38 fastened to the body 33' by means of screws 39 has an eyelet 40 engaged by a spring 41 which with its other end engages a similar eyelet 42 at the lower end of member 37, and tends to pull the member 37 downward. Approximately from the middle of body 33' one duct 43 extends to the one side of bore 36, whereas on the other side four ducts 44, 45, 46 and 47 communicate with the bore 36. The member 37 is provided with a recess 48 in permanent communication with duct 43, a transverse bore 49, and two recesses 50, 51 on the side opposite the recess 48. The recesses are so located that recess 50 connects the ducts 44 and 45 when member 37 is in an upper position in which duct 43 communicates with duct 46 through recess 48 and bore 49, and that recess 51 connects ducts 46 and 47 when in a lower position of member 37 communication between ducts 43 and 45 is established. It has been found advisable so to arrange the recesses and ducts that upon a downward shift of the valve member the communication between ducts 46 and 47 occurs shortly before transverse bore 49 reaches duct 45, and that upon an upward shift, ducts 44 and 45 are connected before bore 49 registers with duct 46. The above-mentioned wire 30 is connected to an eyelet 52 on the upper end of member 37, and guided by a bracket 53 with tube 54 attached to it and clamped at 55 to the gear shift lever 18. Bracket 53 is preferably made of one piece with the handle 20 or rigidly secured thereto. Means are provided to connect the duct 43 of valve 33 to a suitable source of vacuum as for instance the manifold of the automobile engine (not shown). Such means preferably consist of a flexible pipe 56. Similarly, flexible pipes 57 and 58 connect the ducts 45 and 46 to the opposite ends of a booster cylinder 59 in which a piston 60 is movable. The booster cylinder may be suspended from the automobile structure indicated at 61 in such a manner that it is free to change its axial position within limits in view of the path of movement of connected parts which will be described hereinafter. In the illustrated embodiment such suspension comprises the pivot 62 at the rear cylinder end. A lower extension piece 63 is clamped or otherwise rigidly secured to the pedal 10. It may be fork-shaped so as to receive between its prongs 64 the upper end of a flat member 65 pivoted thereto by a pin 66. Member 65 is free to swing with respect to piece 63 only in a forward direction whereas it is prevented by an abutment 67 from moving in the opposite direction in relation to that piece. A number of holes 68 are provided in member 65, through one of which holes a pin 69 is passed for the connection of a link 70 which in turn is connected to the free end of the piston rod 71 of the booster piston 60. The arrangement of the manual control of the brakes is similar to that just described with respect to the clutch control. Thus, the valve 34 is provided with three flexible pipes, only pipe 72 for connection with the manifold of the engine being shown in order to avoid overcrowding of the drawing. The valve 34 acts on a booster cylinder 73 for operation of a member 74 pivoted to an extension piece 75 which is secured to the pedal 14.

The device operates in the following manner:

In a conventional automobile, under normal driving conditions, the clutch is engaged and consequently the pedal 10 in its upper position. Similarly, with the device according to the invention, finger lever 23 will be released so that the spring 41 will have pulled the valve member 37 downward, and the connecting wire 30 will have turned the upper arm of lever 23 forward with respect to the handle 20. If now, in order to disengage the clutch, lever 23 is pressed back in the position of Fig. 1 by a finger of the operator's hand gripping the handle 20, the valve member 37 will be raised against the restraint of spring 41 which though soft enough to be easily tensioned will give the operator the desired feel of a slightly increasing resistance. In its raised position, the valve member connects duct 43 to 46 and duct 45 to 44. In consequence the vacuum prevailing on the side of pipe 43 will be transmitted through pipe 58 to the right hand chamber of the booster cylinder 59 in Fig. 1, whereas the left hand cylinder chamber will be opened to the atmosphere through pipe 57, duct 45, recess 50 and duct 44. The vacuum on the right hand side of the piston 60 will cause the latter to move in the same direction. Owing to its connection with the piston, member 65 will also move to the right and, bearing against the abutment 67, take the pedal 10 along so as to turn about the axis of shaft 11 and to disengage the clutch. In this position of the parts, i. e. while holding lever 23 with his finger back in recess 21, the operator may shift lever 18 as desired. When he wishes to engage the clutch, he will release lever 23. Spring 41 will return valve member 37 and lever 23 to their original positions, so that duct 45 will be connected to duct 43 and duct 46 to 47. This reverses the pressure heads in the booster cylinder. The piston 60 will move to the left permitting the pedal 10 to swing back to its original position owing to the action of means (not shown) normally provided in an automobile for that purpose. It is noteworthy that in returning the pedal, such last mentioned means, usually consisting of a spring are not additionally loaded by any restraint originating with the booster device. If now the same or another operator wishes to actuate the clutch by means of the pedal 10 rather that lever 23, no alterations whatsoever are required. Depressing of the pedal will move the piece 13 to disengage the clutch in the same manner as if the new device were not existing. Such operation of the pedal will have no effect on the booster device as the piece 63 can freely swing in relation to the member 65. Thus it will be clear that my invention hereinbefore described can be readily applied as an attachment to any vehicle of conventional type to allow for manual operation of a pedal-operative organ, provided a source of vacuum, such as the manifold of an internal combustion engine is available. In order to adapt the booster piston movement to the angle through which the pedal can be turned the holes 68 in member 65 are provided. By selecting the one or another of the holes for the attachment of link 70, a desired ratio of the movements can be adjusted.

The operation of the manual control of the brake pedal 14 is similar to that described with respect to the clutch pedal control. By pressing lever 24 back into the recess 22 the pedal 24 will be turned down under the action of the booster 73 and associated parts. As stated above, both levers 23 and 24 are attached to the handle in a side by side arrangement so that they can be operated by two fingers of the same hand either separately or simultaneously. In order to hold either one or both of the levers in their recesses, a detent may be provided which in the case of the illustrated embodiment consists of an open ring 76 engaging with its free ends 77 and 78 in the handle. The ring can be turned from the position shown in solid lines of Fig. 1 over the top end of the handle in the position 76' thereby retaining one or both finger levers in pressed-back position. In all other respects the two control devices are entirely independent of each other. It is of course within the scope of the present invention to provide only one of the devices either for the brake or the clutch control, in which event only one finger lever may be attached to the handle 20. The selection of the pedal to which a device according to my invention is to be applied, or the application of devices to two pedals, will usually be determined according to the nature and extent of the operator's incapacity in using his legs.

In the embodiment of Figs. 1 to 3 I have shown my invention in connection with a gear shift lever of the upright type. However, it will be clear that the finger levers as well as the booster cylinders and valves may be attached to any other suitably selected part or parts, whether shiftable or stationary. The combination of the finger levers with the handle of the gear shift lever, however, is considered as most appropriate as it greatly facilitates gear shifting operations. For this reason, the embodiment, Figs. 4 and 5, illustrates an arrangement of the finger levers applied to a shift lever of the second conventional type, i. e. a substantially horizontal shift lever near the steering wheel of a car. In these figures, the steering wheel is denoted by 100, the steering column by 101 and the gear shift lever by 102. The handle 20 is so secured on the latter, that the finger levers 23 and 24 project forward. The flexible guide tubes 54 for the wires or cables 30 are clamped at 103 to the gear shift lever and at 104 to the steering column to which also the valves 33 and 34 are fastened. The other parts of the device are not shown nor do they require further explanation as they are of the same structure and arrangement as in the embodiment first described.

It will be apparent to those skilled in the art that many alterations and modifications of the structure shown may be made without departure from the essence and spirit of my invention which for this reason shall not be limited but by the scope of the appended claims.

I claim:

1. An attachment for a vehicle including a gas engine and having a gear shift lever and a pedal-operative control device such as a brake or clutch, the combination of a handle of said gear shift lever, a finger-operative lever pivoted to said handle, a booster device including a spring-biased valve, means to connect said valve to the suction manifold of said gas engine and a member reciprocatable by vacuum under the control of said valve, said spring tending to hold said valve in a position in which said member is shifted in one direction, said finger lever being connected to said valve so as to shift the latter against the restraint of said spring in another position when the finger lever is operated whereby said member will be moved in the other direction, a first element adapted to be rigidly attached to said pedal, a second element, a pivot about which one of said elements is turnable in relation to the other, an abutment on one of said elements for engagement by the other to prevent turning of the one element relatively to the other in one direction, and a link attached to said second element for pivoted attachment of said member, whereby said pedal will be depressed when said member is moved in said other direction and will be free to be depressed by an operator's foot without reaction on said booster device.

2. An attachment as claimed in claim 1, further comprising a detent attached to said handle and being shiftable from an inoperative position into an operative position to lock said finger lever in a position in which said member is moved in said other direction.

3. An attachment for a gas-engine-powered vehicle having a gear shift lever and a pedal-operative clutch and a pedal-operative brake, a handle adapted to be attached to said gear shift lever, two booster devices operative independently from each other and being adapted for connection to said pedals respectively so as to actuate the latter, each device including a spring-biased valve to control the co-ordinate booster device, two finger-operative levers, one for each valve and connected thereto to operate said valve, both said finger-levers being pivoted to said handle in a side by side arrangement.

4. An attachment as claimed in claim 3, said valves including means for attachment to opposite sides of said gear shift lever.

5. In a vehicle including a source of vacuum and a pedal-operative control device such as a brake or clutch, the combination of a finger-operative lever, a booster device including a cylinder closed at both ends, a piston movable therein, and a valve having at least four ports, respectively connected to said vacuum source, to the two ends of said cylinder, and to the atmosphere, said valve including a valving member movable between two end positions and so constructed as to connect in the one end position, the one cylinder end to said vacuum source and the other end to the atmosphere, and in the other position, the one cylinder end to the atmosphere and the other to the vacuum source, a spring attached to said valving member and tending to hold it in the one end position, a connection between said finger lever and said valving member whereby said valving member can be shifted by finger pressure against the restraint of said spring, and a connection between said pedal operative control device and said piston.

6. An attachment as claimed in claim 1, wherein said pedal is oscillatable about an axis, and said first element when attached constitutes a lever in respect to said axis, said second element embodying a plurality of means differently spaced from said axis, for the attachment of said link whereby the ratio of the stroke of said member over the movement of the pedal caused by said member can be selectively adjusted.

7. An attachment for a vehicle including a gas engine and having a gear shift lever and a pedal-operative control device such as a brake or clutch, the combination of a handle of said gear shift lever, a finger-operative lever pivoted to said handle, a booster device including a spring-biased valve, a cylinder and a piston reciprocatable in said cylinder by vacuum under the control of said valve, means to attach said valve to said gear shift lever, flexible pipe connections between said valve and said cylinder, another flexible pipe connection between said valve and the suction manifold of said gas engine, said spring tending to hold said valve in a position in which said piston is shifted in one direction, said finger lever being connected to said valve so as to shift the latter against the restraint of said spring in another position when the finger lever is operated whereby said piston will be moved in the other direction, a member adapted to be rigidly attached to said pedal, a lost motion connection between said piston and said member, whereby said pedal will be depressed when said piston is moved in said other direction and will be free to be depressed by an operator's foot without reaction on said booster device.

THOMAS M. ROBERTSON.

REFERENCES CITED

The following references are of record in the file of this patent:

UNITED STATES PATENTS

| Number | Name | Date |
|---|---|---|
| 1,119,364 | Morden | Dec. 1, 1914 |
| 1,179,037 | Randall | Apr. 11, 1916 |
| 1,403,390 | Cameron | Jan. 10, 1922 |
| 1,747,190 | Sheirs | Feb. 18, 1930 |
| 1,893,471 | Hill | Jan. 3, 1933 |
| 1,928,143 | Vasselli | Sept. 26, 1933 |
| 2,016,308 | Wyllie | Oct. 8, 1935 |
| 2,039,095 | Lower | Apr. 28, 1936 |